United States Patent
Hsu

(10) Patent No.: US 9,158,400 B2
(45) Date of Patent: Oct. 13, 2015

(54) TOUCH PANEL HAVING VIRTUAL FUNCTION BUTTON, METHOD OF MANUFACTURING THE SAME, AND METHOD OF IDENTIFYING TOUCH CONFLICT ON THE SAME

(71) Applicant: ELAN MICROELECTRONICS CORPORATION, Hsin Chu (TW)

(72) Inventor: Chi-Fang Hsu, Hsinchu (TW)

(73) Assignee: ELAN MICROELECTRONICS CORPORATION, Hsin Chu (TW)

( * ) Notice: Subject to any disclaimer, the term of this patent is extended or adjusted under 35 U.S.C. 154(b) by 179 days.

(21) Appl. No.: 13/802,796

(22) Filed: Mar. 14, 2013

(65) Prior Publication Data

US 2014/0145978 A1 May 29, 2014

(30) Foreign Application Priority Data

Nov. 23, 2012 (TW) .............................. 101143885 A

(51) Int. Cl.
*G06F 3/041* (2006.01)
*H05K 3/30* (2006.01)

(52) U.S. Cl.
CPC .............. *G06F 3/041* (2013.01); *G06F 3/0416* (2013.01); *G06F 2203/04103* (2013.01); *Y10T 29/49105* (2015.01)

(58) Field of Classification Search
None
See application file for complete search history.

(56) References Cited

U.S. PATENT DOCUMENTS

| | | | |
|---|---|---|---|
| 5,870,083 A * | 2/1999 | Shieh ............................ | 345/173 |
| 6,232,961 B1 * | 5/2001 | Kunimatsu et al. ........... | 345/173 |
| 8,854,316 B2 * | 10/2014 | Shenfield ...................... | 345/173 |
| 9,052,757 B2 | 6/2015 | Kubo et al. | |
| 2006/0101338 A1 * | 5/2006 | Kates ............................ | 715/716 |
| 2009/0122026 A1 | 5/2009 | Oh | |
| 2009/0237368 A1 * | 9/2009 | Hwang et al. ................. | 345/173 |
| 2010/0227640 A1 * | 9/2010 | Kim et al. .................. | 455/550.1 |
| 2011/0018695 A1 * | 1/2011 | Bells et al. ................. | 340/407.2 |
| 2011/0035691 A1 * | 2/2011 | Kim .............................. | 715/765 |
| 2011/0043489 A1 * | 2/2011 | Yoshimoto et al. ........... | 345/175 |
| 2012/0032917 A1 | 2/2012 | Yamaguchi | |
| 2012/0108337 A1 * | 5/2012 | Kelly et al. ..................... | 463/37 |
| 2012/0162084 A1 * | 6/2012 | Lee ............................... | 345/169 |
| 2012/0188178 A1 * | 7/2012 | Hamada ....................... | 345/173 |
| 2012/0306927 A1 * | 12/2012 | Lee et al. ...................... | 345/660 |
| 2013/0088455 A1 * | 4/2013 | Jeong ............................ | 345/173 |
| 2013/0167077 A1 * | 6/2013 | Nishihashi ................... | 715/800 |
| 2013/0212515 A1 * | 8/2013 | Eleftheriou ................... | 715/773 |

(Continued)

FOREIGN PATENT DOCUMENTS

| | | | |
|---|---|---|---|
| JP | 2009-123193 A | 6/2009 | |
| JP | 2009-289025 A | 12/2009 | |

(Continued)

*Primary Examiner* — Peter Vincent Agustin
(74) *Attorney, Agent, or Firm* — Muncy, Geissler, Olds & Lowe, P.C.

(57) ABSTRACT

A touch device capable of identifying touch conflict has at least one function button mounted on a touch panel of the touch device and at least one auxiliary button mounted around the at least one function button. The at least one function button and the at least one auxiliary button are touch-activated. When users simultaneously or sequentially touch the at least one function button and the at least one auxiliary button, the touch device determines that a touch conflict occurs and determines whether to execute a function originally defined by the at least one function button or to execute another function according to the touch conflict.

21 Claims, 16 Drawing Sheets

(56) References Cited

U.S. PATENT DOCUMENTS

| | | | |
|---|---|---|---|
| 2013/0298024 A1* | 11/2013 | Rhee et al. | 715/716 |
| 2014/0068512 A1* | 3/2014 | Wong et al. | 715/810 |
| 2014/0104217 A1 | 4/2014 | Horiguchi | |
| 2014/0145978 A1* | 5/2014 | Hsu | 345/173 |

FOREIGN PATENT DOCUMENTS

| | | |
|---|---|---|
| JP | 2012-150594 A | 8/2012 |
| JP | 2012-198924 A | 10/2012 |
| JP | 2012-248068 A | 12/2012 |
| WO | WO 2010/126072 A1 | 11/2010 |

* cited by examiner

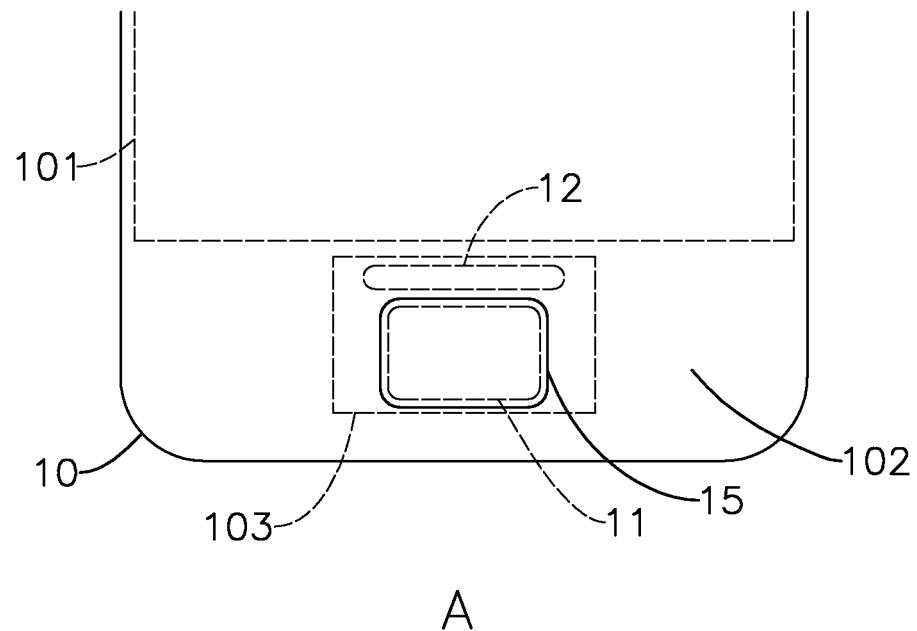
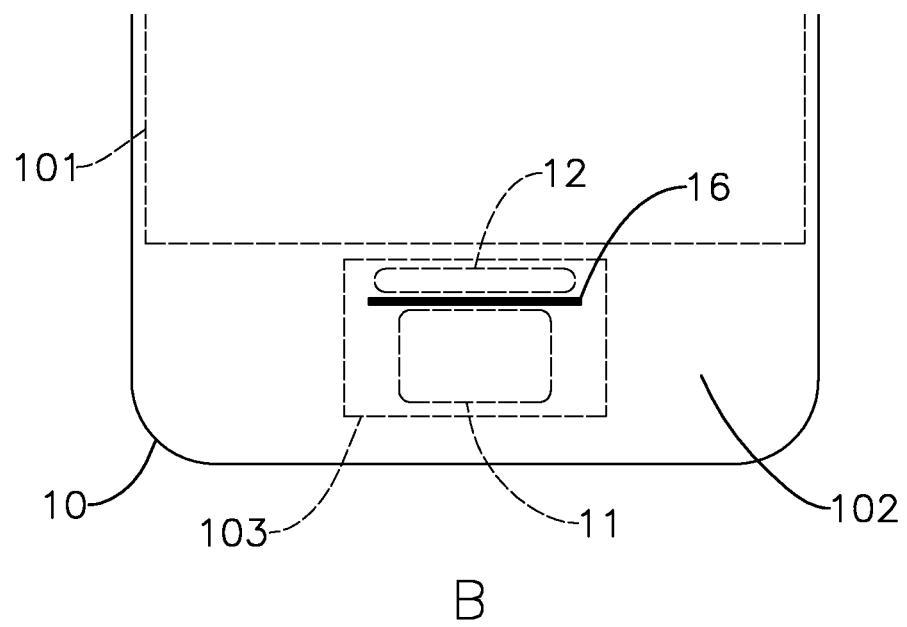
FIG.6

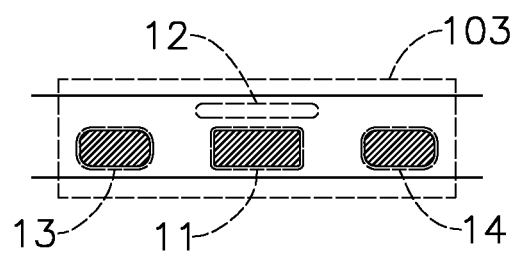
A
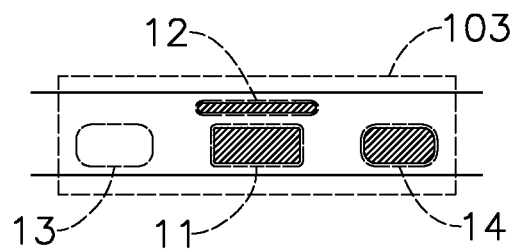
B
FIG.11

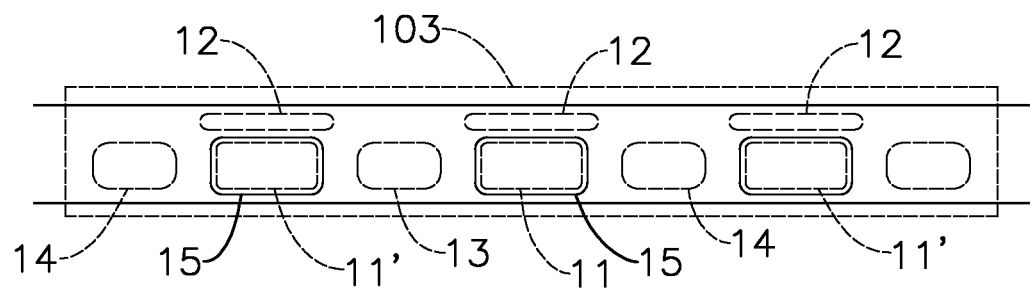
A
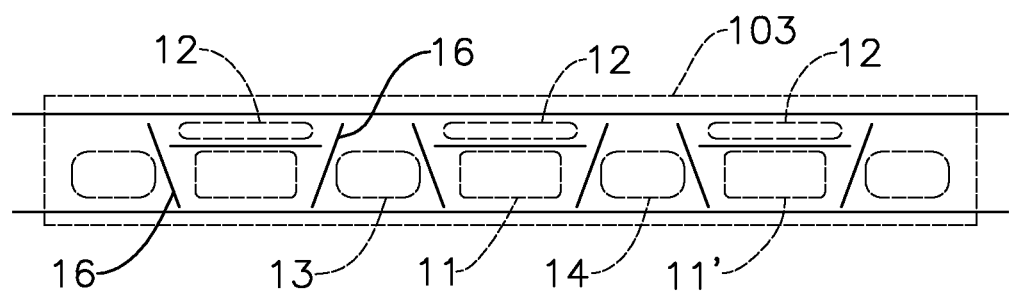
B
FIG. 13

TOUCH PANEL HAVING VIRTUAL FUNCTION BUTTON, METHOD OF MANUFACTURING THE SAME, AND METHOD OF IDENTIFYING TOUCH CONFLICT ON THE SAME

BACKGROUND OF THE INVENTION

1. Field of the Invention

The present invention relates to a touch panel, a method of manufacturing the touch panel, and a method of identifying touch conflict on the touch panel, and more particularly to related techniques in association with a touch panel having virtual function button, a method of manufacturing the touch panel having a function button generating a sensing signal in response to a touch event on the touch panel, and a method of further identifying if any touch conflict occurs when users touch the function button on the touch panel.

2. Description of the Related Art

Apple Inc. launched the iPhone smartphone series in year 2007 and the iPad tablet PC series in 2010. After said products prevail on the worldwide markets of smartphones and computers, touch device has become one of the most important operation interfaces of handheld or portable electronic devices (hereafter called portable touch devices). All the major portable touch devices in the current market almost come with a fully touch-based interface for operation without requiring any additional peripheral equipment except that most portable touch devices provide a mechanical Home Key mounted on a bordering portion of an active area of the touch devices thereof. Whenever users press the Home Key, the screen display returns to the Home screen that is most recently viewed during the process of any existing function. Hence, the utilization rate of the Home Key is relatively high. As the Home Key has a mechanical structure, the relatively high utilization rate leads to a relatively high failure rate. According to statistics, one of the most frequent faults of the portable touch devices requesting repair service is faulty Home Key. One way of tackling the issue is to create a virtual button, such as the "AssistiveTouch" function of iPhone or iPad, supported by the operating system of the portable touch devices. The virtual button can reduce the use of the Home Key and thus make the Home Key more durable. However, once the virtual button function is activated, the virtual button will appear on a view area, and it could cause visual interference to users on certain occasions, such as playing a game. Although users can move the virtual button to somewhere else within the view area, the operational inconvenience caused still exists.

Moreover, most portable touch devices usually incorporate a lot of functions, namely, camera, personal digital assistant, game, digital media player, wireless communication, Internet access, e-mail and the like, and have undoubtedly functioned as a small computer. The diversified purposes of the portable touch devices inevitably lead to demand for other buttons in addition to the Home Key available on the portable touch devices. However, if the issue of the fault-prone Home Key is not effectively resolved, the button expansion may still be impractical.

Irrespective of the solution of the fault-prone Home Key or the consideration of button expansion, the touch-based virtual function button on the portable touch devices is a feasible solution that replaces the physical button, initiates the function of the Home Key by touching the virtual function button, gets rid of the mechanical wear of the physical button, and lowers the production cost. However, the trade-off of using the virtual function button is the problem of touch conflict.

When a function button on a touch device is activated by touch, it means that a corresponding function is initiated after the function button is touched. As the portable touch devices are designed for multiple purposes, users may hold or operate the portable touch devices with various postures or at various angles, for example, palm ejection. Hence, the function buttons on a touch device could be touched intentionally or unintentionally under different circumstances. How to determine if a function button is touched intentionally or unintentionally by users is a pre-requisite to the implementation of the virtual function button.

SUMMARY OF THE INVENTION

A first objective of the present invention is to provide a touch device having at least one function button mounted on a touch panel thereof and at least one auxiliary button mounted around the at least one function button serving to determine if a touch conflict occurs according to users' operational intention when users touch the at least one function button and the at least one auxiliary button simultaneously or sequentially.

To achieve the foregoing objective, the touch device has a touch panel and a controller.

The touch panel has a virtual button area, at least one function button and at least one auxiliary button.

The at least one function button is mounted within the virtual button area and is touch-activated.

The at least one auxiliary button is mounted around the at least one function button and is touch-activated.

The controller is connected to the at least one function button and the at least one auxiliary button, and determines if a touch conflict occurs according to whether the at least one function button and the at least one auxiliary button are touched.

The foregoing touch device has the at least one function button and the at least one auxiliary button mounted within the virtual button area of the touch panel thereof. The at least one auxiliary button is mounted around the at least one function button. The controller detects the sensing signal variations of the at least one function button and the at least one auxiliary button to determine if a touch conflict occurs. When only detecting the sensing signal variation of the at least one function button, the controller determines that no touch conflict occurs. When detecting the sensing signal variations of the at least one function button and the at least one auxiliary button, the controller determines that a touch conflict occurs. When the touch conflict occurs, the controller then determines whether to execute a function originally defined by the at least one function button or to execute another function.

A second objective of the present invention is to provide a method of identifying touch conflict on a touch panel with a function button mounted on the touch panel, using touch conflict detection technique to analyze behavior model of users upon touching the function button, further determining the execution of a function corresponding to the function button to respond to the operational intention of users upon touching the function button, and accurately fulfilling the function defined by the function button.

To achieve the foregoing objective, the method of identifying touch conflict on a touch panel has steps of:

detecting if a function button mounted on the touch panel is touched to generate a first sensing signal variation;

detecting if an auxiliary button mounted on the touch panel is touched to generate a second sensing signal variation; and if the first sensing signal variation and the second signal variation are detected, determining that a touch conflict occurs.

The foregoing method is implemented by mounting a function button and at least one auxiliary button on a touch panel and detecting the sensing signal variations of the function button and the at least one auxiliary button when they are touched. When detecting that only the function button is touched, the method determines that no touch conflict occurs. When detecting that the function button is touched and the at least one auxiliary button is also touched, the method determines that a touch conflict occurs. The method further determines users' true intention according to the touch conflict when users touch the function button.

A third objective of the present invention is to provide a method of manufacturing a touch panel having virtual function button, which forms a touch sensing area and a virtual button area on the touch panel, and at least one function button and at least one auxiliary button on the virtual button area to detect touch conflict when users touch the at least one function button and the at least one auxiliary button.

To achieve the foregoing objective, the method of manufacturing a touch panel having virtual function button has steps of:
  providing a substrate;
  defining a touch sensing area and a virtual button area on the substrate;
  forming a sensing layer within the touch sensing area; and
  forming multiple button electrodes within the virtual button area, wherein the button electrodes include at least one function button electrode and at least one auxiliary button electrode.

The foregoing manufacturing method defines a touch sensing area and a virtual button area on a substrate, forms a sensing area within the touch sensing area to serve as a main operation interface of the touch panel, and multiple button electrodes within the virtual button area to serve as function button and auxiliary button, thereby supporting a hardware structure realizing the function button on the touch panel.

Other objectives, advantages and novel features of the invention will become more apparent from the following detailed description when taken in conjunction with the accompanying drawings.

BRIEF DESCRIPTION OF THE DRAWINGS

FIGS. 6A and 6B are schematic views respectively illustrating grounding protections for a function button and an auxiliary button of the touch device in FIG. 1;

FIGS. 11A and 11B are schematic views illustrating two more touched states determined by the method in FIG. 9;

FIGS. 13A and 13B are schematic views respectively illustrating grounding protections for multiple function buttons and multiple auxiliary buttons of the touch device in FIG. 12;

DETAILED DESCRIPTION OF THE INVENTION

Figure 1:
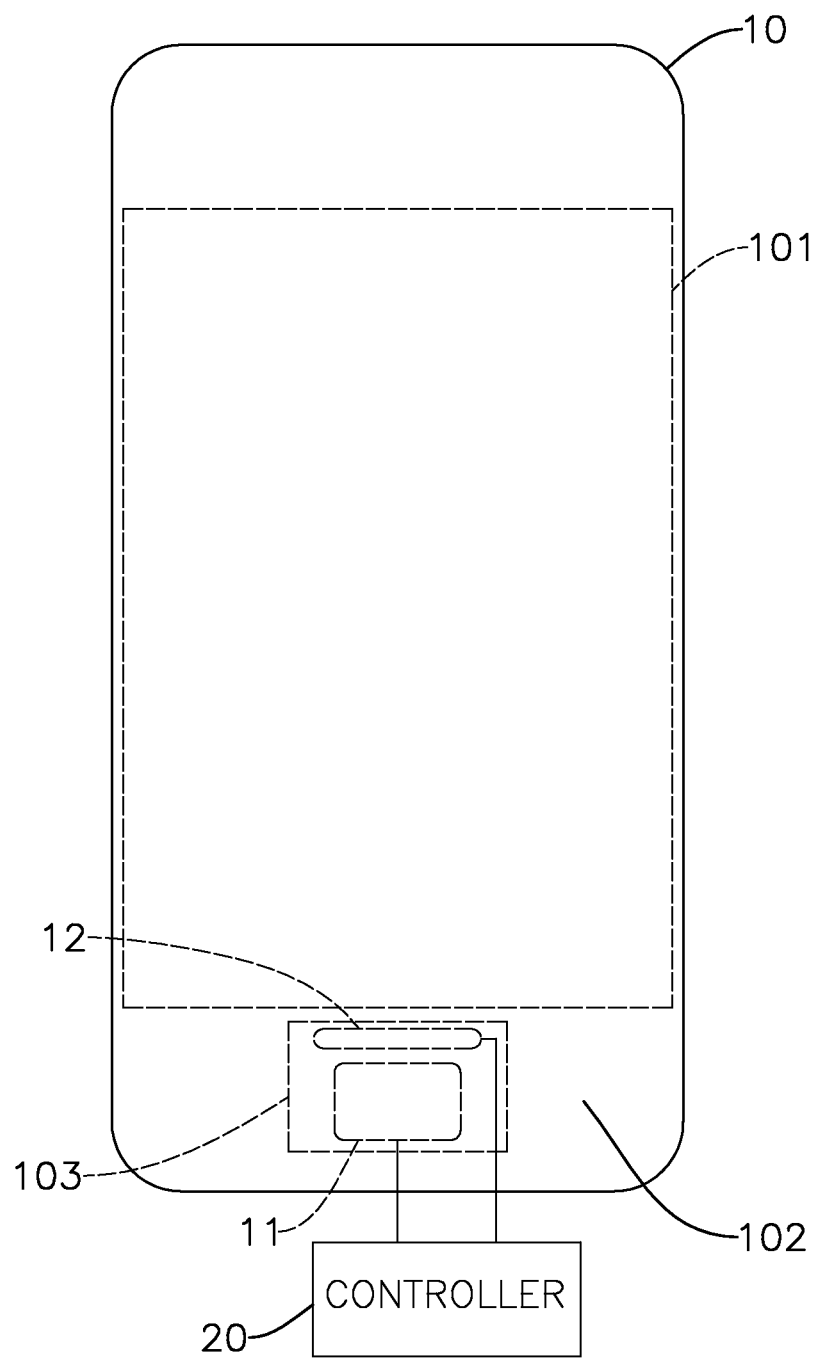
FIG. 1 is a schematic view of a first embodiment of a touch device in accordance with the present invention.

With reference to FIG. 1, a first embodiment of a touch device in accordance with the present invention has a touch panel 10 and a controller 20.

Figure 2:
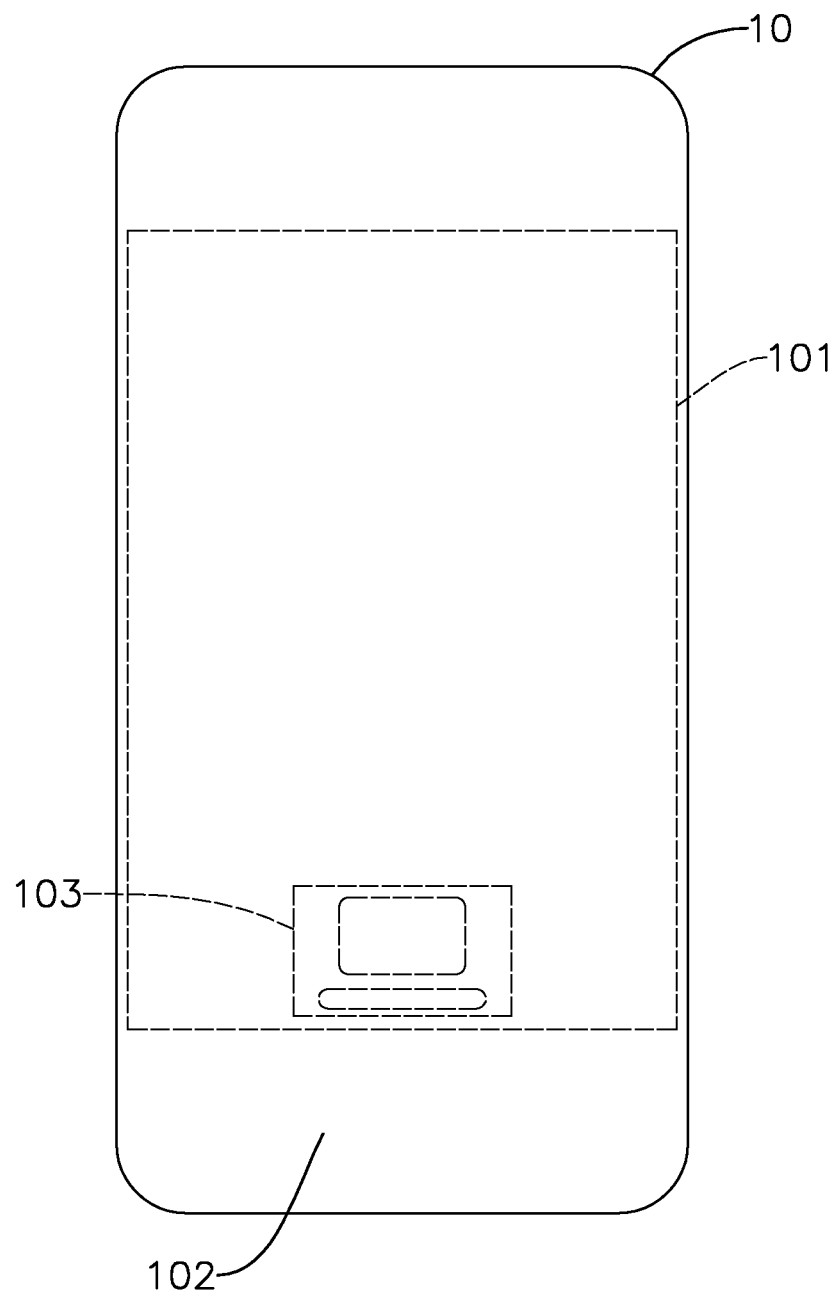
FIG. 2 is a schematic view of a touch device in FIG. 1 having a virtual button area.
Figure 3:
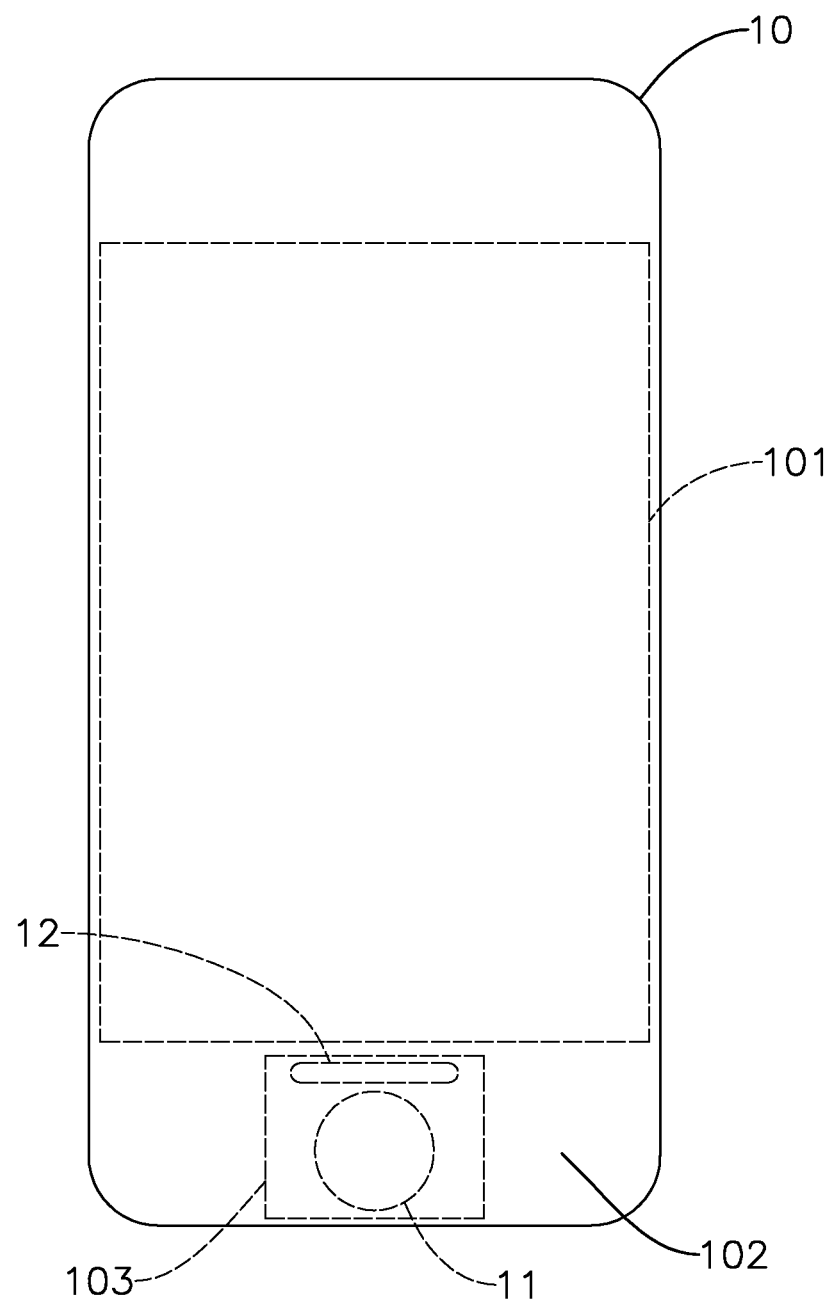
FIG. 3 is a schematic view of the touch device in FIG. 1 having a function button and an auxiliary button.

The touch panel 10 has a view area 101 and an active zone 102. The view area 101 serves as a touch area to generate a sensing signal arising from a touch event. The active zone is formed around the view area 101. It is stressed that despite the availability of the view area and the active zone, conventional touch panels are not fully touch-activated because the active zone provides no touch function. The touch panel 10 of the present invention further has a virtual button area 103. The virtual button area 103 may be located within the active zone 102 or within the view area 101 as shown in FIG. 2. The virtual button area 103 has a function button 11 and an auxiliary button 12, each of which can be activated by a touch. The function button 11 and the auxiliary button 12 may be triangular, rhombic, rectangular, square in shape or in other feasible geometric shape. With reference to FIG. 3, the function button 11 is round and the auxiliary button 12 is rectangular. However, the foregoing shapes of the function button 11 and the auxiliary button 12 are illustrated as the examples thereof instead of serving as criteria for limiting their shapes.

With further reference to FIG. 1, in the present embodiment, the virtual button area 103 is located within the active zone 102, the auxiliary button 12 within the virtual button area 103 may be located anywhere around the function button 11, such as on the top, on the bottom, on the left, on the right, on the oblique top left, on the oblique bottom left, on the oblique top right, or on the oblique bottom right. When the auxiliary button 12 is located on the left or right of the function button 11, a distance between the function button 11 and the auxiliary button 12 is in a range of 8 to 15 mm. When the auxiliary button 12 is located on the top or bottom of the function button 11, a distance between the function button 11 and the auxiliary button 12 is in a range of 2 to 6 mm.

The virtual button area 103 has a length and a width. The function button 11 and the auxiliary button 12 may be aligned next to each other along the direction of the length or the width. In the present embodiment, the function button 11 and the auxiliary button 12 are aligned next to each other along the direction of the width, and the auxiliary button 12 is located between the function button 11 and a borderline between the active zone 102 and the view area 101.

The controller 20 is connected to the function button 11 and the auxiliary button 12 to detect a sensing signal variation after the function button 11 and the auxiliary button are touched.

The controller 20 determines the occurrence of a touch conflict according to whether the function button 11 and the auxiliary button 12 are touched. When only the function button 11 is touched with the auxiliary button 12 untouched to generate a sensing signal variation, it indicates that the action of users touching the function button 11 is accurate and decisive. Hence, the controller 20 determines that no touch conflict occurs and sends a command to execute a first function. When the controller 20 detects that both the function button 11 and the auxiliary button 12 are touched, it indicates that users inadvertently touch the function button 11 and the auxiliary button 12 at the same time. Under the circumstance, the controller 20 determines that a touch conflict occurs.

Although the foregoing touch conflict occurs during the operation of the function button 11, the event may not exactly arise from an incorrect touch operation. As a result, when the touch conflict occurs, the controller 20 may stop sending a command for executing the first function, or stop sending a command for executing the first function but sending a command for executing a second function.

Figure 4:
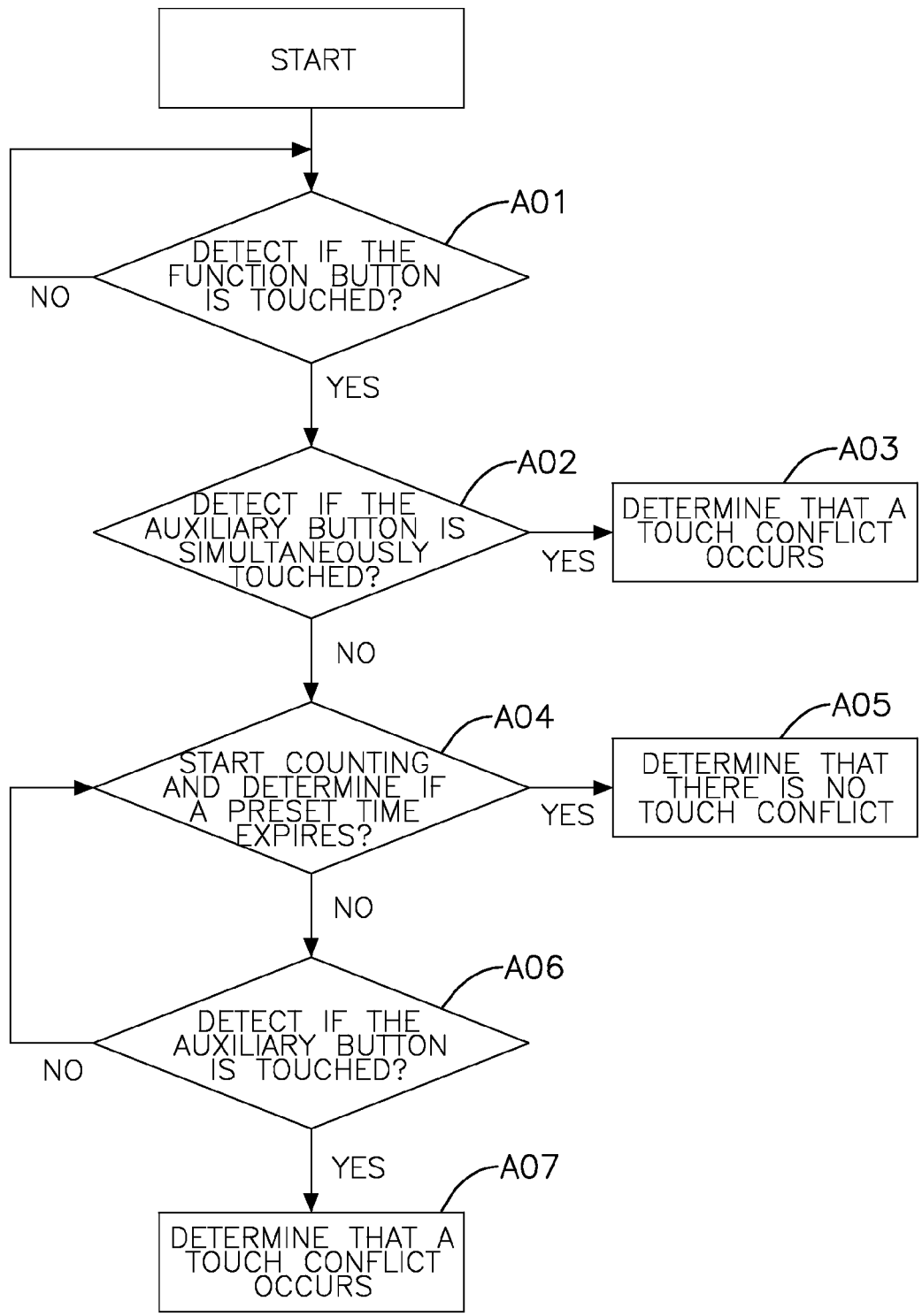
FIG. 4 is a flow diagram of a first embodiment of a method of identifying touch conflict on a touch device in accordance with the present invention.

With reference to FIG. 4, a first embodiment of a method of identifying touch conflict on a touch device in accordance with the present invention has the following steps.

Step A01: Detect if the function button is touched, that is, the function button generates a sensing signal variation. If detecting that the function button generates a sensing signal variation, perform next step; otherwise, resume the current step.

Step A02: Detect if the auxiliary button is simultaneously touched.

Step A03: If positive, determine that a touch conflict occurs; otherwise, perform next step.

Step A04: Start counting and determine if a preset time expires.

Step A05: If positive, determine that there is no touch conflict; otherwise, perform next step.

Step A06: Detect if the auxiliary button is touched.

Step A07: If positive, determine that a touch conflict occurs; otherwise, resume step A04.

Figure 5:
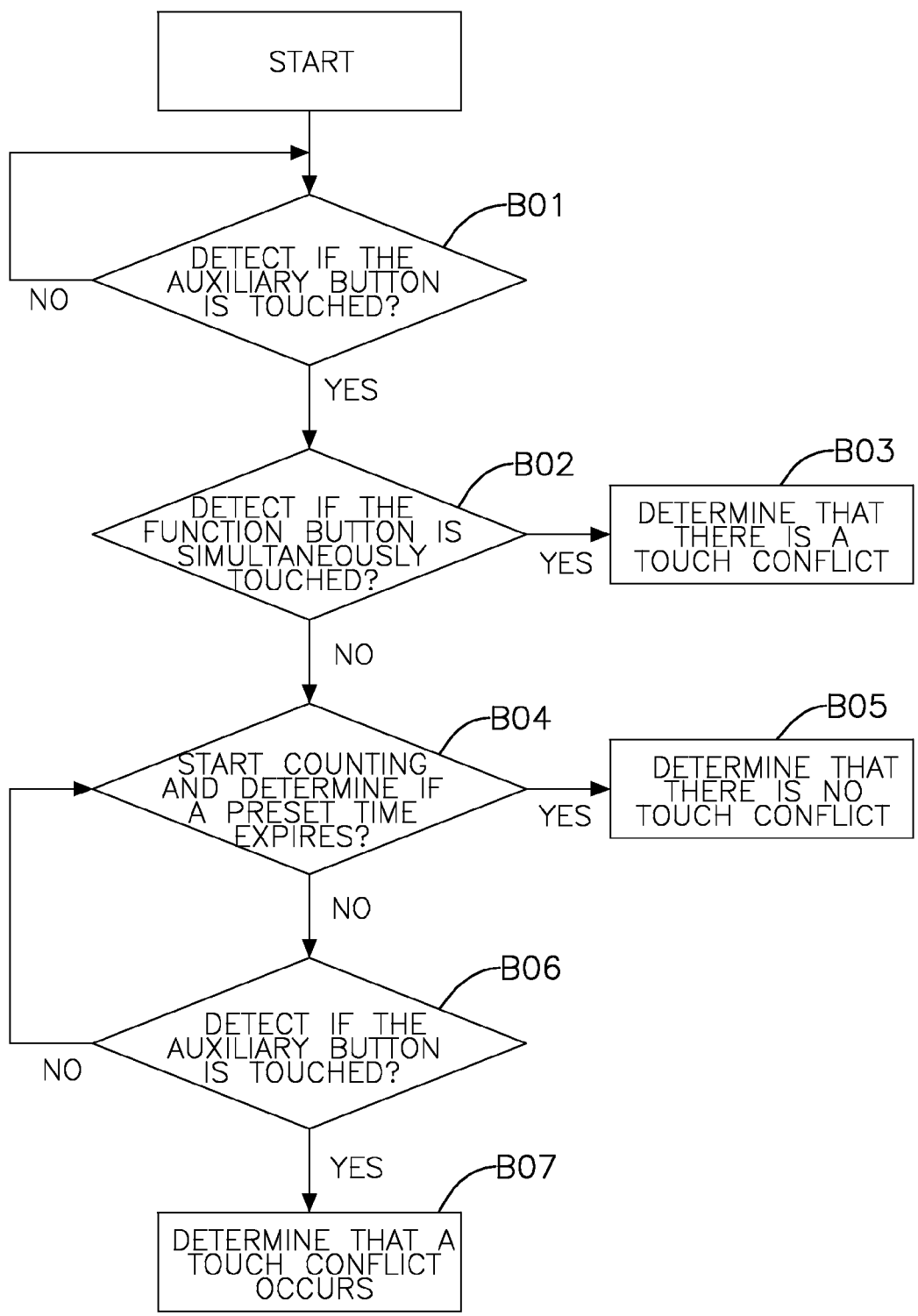
FIG. 5 is another flow diagram of the method in FIG. 4.

With reference to FIG. 5, the foregoing method has the following steps.

Step B01: Detect if the auxiliary button is touched. If positive, perform next step; otherwise, perform the current step.

Step B02: Detect if the function button is simultaneously touched.

Step B03: If positive, determine that there is a touch conflict; otherwise, perform next step.

Step B04: Start counting and determine if a preset time expires.

Step B05: If positive, determine that there is no touch conflict; otherwise, perform next step.

Step B06: Detect if the auxiliary button is touched.

Step B07: If positive, determine that a touch conflict occurs; otherwise, resume step B04.

From the foregoing, the controller 20 determines that a touch conflict occurs when detecting the sensing signal variations of both the function button and the auxiliary button under the following conditions.

Condition 1: when detecting that the function button and the auxiliary button are touched simultaneously.

Condition 2: when detecting that the auxiliary button is touched within a preset time after detecting that the function button is touched.

Condition 3: when detecting that the function button is touched within a preset time after detecting that the auxiliary button is touched.

The condition 1 indicates that users simultaneously touch the function button 11 and the auxiliary button 12. Under the condition, the controller 20 can stop sending a command for executing the first function.

The condition 2 indicates that users touch the function button 11 first and then slide from the function button 11 to the auxiliary button 12 to touch the auxiliary button 12.

The condition 3 indicates that users touch the auxiliary button 12 first and then slide from the auxiliary button 12 to the function button 11 to touch the function button 11.

As to the foregoing conditions 2 and 3, the controller 20 can stop sending the command for executing the first function and further send a command for executing a second function.

For example, if the function button 11 on the touch panel 10 is originally defined to execute a HOME button, the execution of the HOME button can be restricted because of the occurrence of the touch conflicts caused by the foregoing conditions 1 to 3. If the touch conflict is caused by the condition 2 or 3, in addition to stopping the execution of the HOME button, another function, such as touch device locking and unlocking, task list launching and the like, is further executed.

Regarding the function of unlocking a touch device with a slide, it indicates that the touch device can be unlocked by a slide from the function button 11 to the auxiliary button 12 or from the auxiliary button 12 to the function button 11 when an operating system installed in the touch device is in a locked state.

Regarding the function of launching a task list, it indicates that the latest released operating system Window 8 supports an edge swipe quickly swiping from an edge portion of a touch panel to a center thereof and launching a task list, and a touch conflict caused by the swipe and the condition 2 can launch a command in the task list after stopping the execution of the HOME button.

Regarding the foregoing touch device, with reference to FIG. 6A, a grounding protection line 15 is mounted around the function button 11 of the touch panel 10 of the touch device, or with reference to FIG. 6B, a grounding protection line 16 is mounted between the function button 11 and the adjacent auxiliary button 12 to further ensure the correctness of the touch operation of the function button 11.

Figure 7:
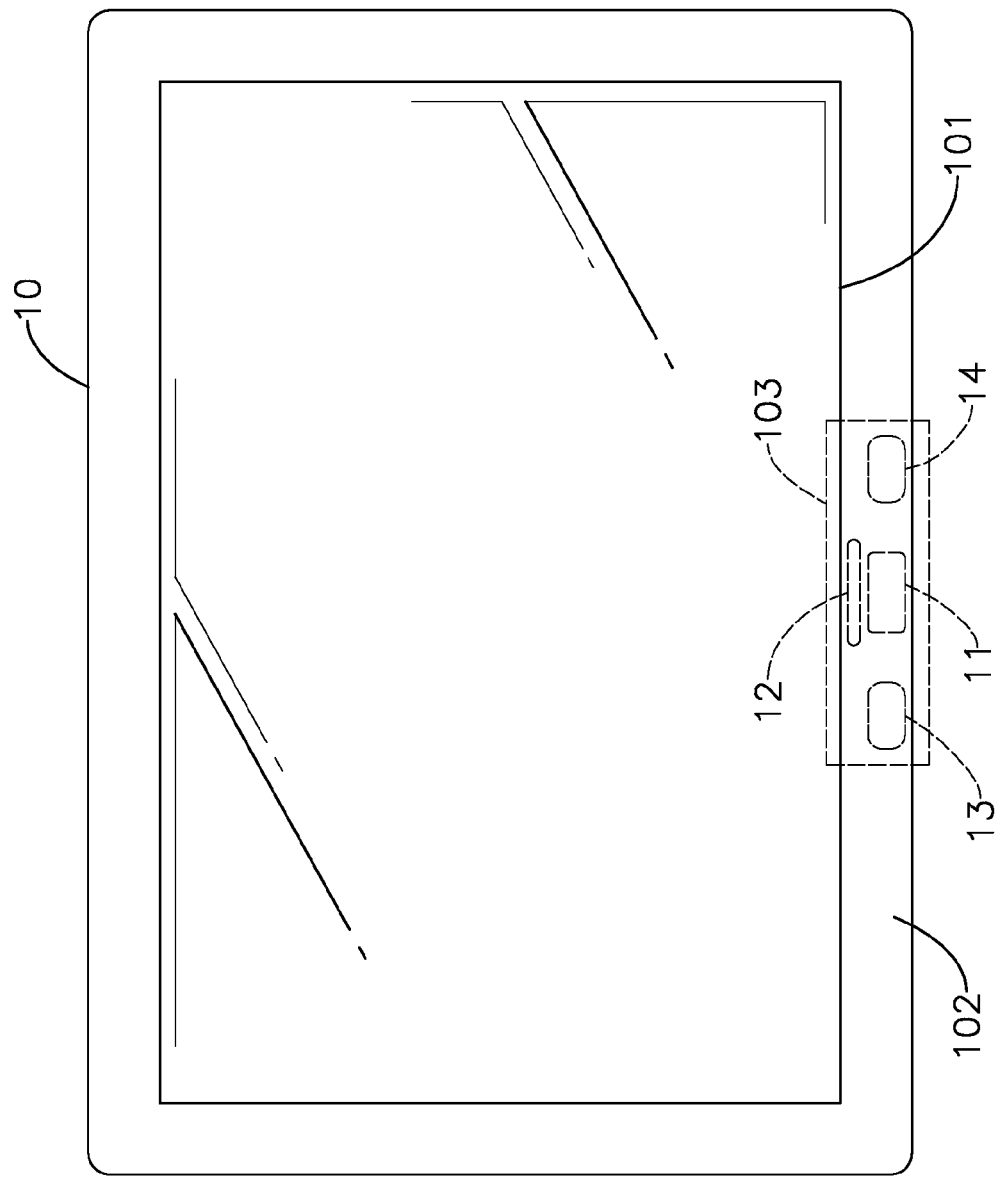
FIG. 7 is a schematic view of a second embodiment of a touch device in accordance with the present invention.

With reference to FIG. 7, a second embodiment of a touch device in accordance with the present invention is structurally similar to the foregoing embodiment in having a touch panel 10 and a controller 20, in which the touch panel 10 still has a view area 101 serving as a touch area, an active zone 102, and a virtual button area 103 located within the view area 101 or the active zone 102. The present embodiment differs from the foregoing embodiment in that the virtual button area 103 has at least one function button 11 and multiple auxiliary buttons 12~14. The at least one function button 11 and the auxiliary buttons 12~14 are similarly activated by touching them, and may be triangular, round, rhombic, trapezoidal, rectangular, square or in any other geometric shapes.

Figure 8:
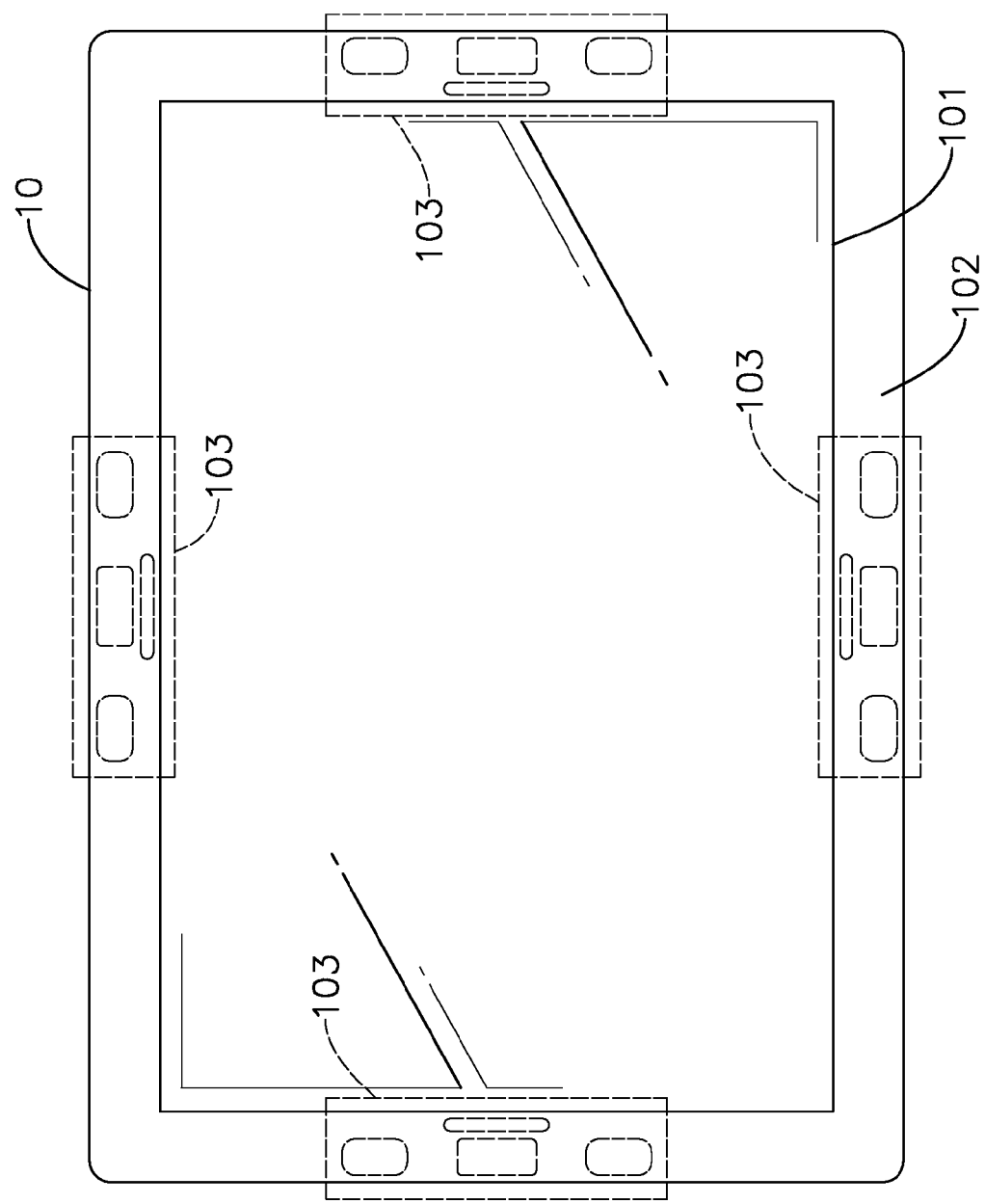
FIG. 8 is a schematic view of the touch device in FIG. 7 having a virtual button area selectively formed on four locations of an active zone of the touch device.

In the present embodiment, the virtual button area 103 is still located within the active zone 102 of the touch panel 10. Besides, with reference to FIG. 8, the virtual button area 103 can be located on different positions on the active zone 102.

With further reference to FIG. 7, similar to that of the foregoing embodiment, the virtual button area 103 of the present embodiment has a length and a width. In the present embodiment, the function button 11 and the auxiliary button 12 are aligned next to each other along the direction of the width, and one of the auxiliary buttons 12 is located between the function button 11 and a borderline between the active zone 102 and the view area 101. The function button 11 is located between the other two auxiliary buttons 13, 14 and the function button 11, and the two auxiliary buttons 13, 14 are aligned along the direction of the length. A distance from the function button 11 to one of the two auxiliary buttons 13, 14 is in a range of 8 to 15 mm. A distance between the function button 11 and the auxiliary button 12 on top of the function button 11 is in a range of 2 to 6 mm.

Figure 9:
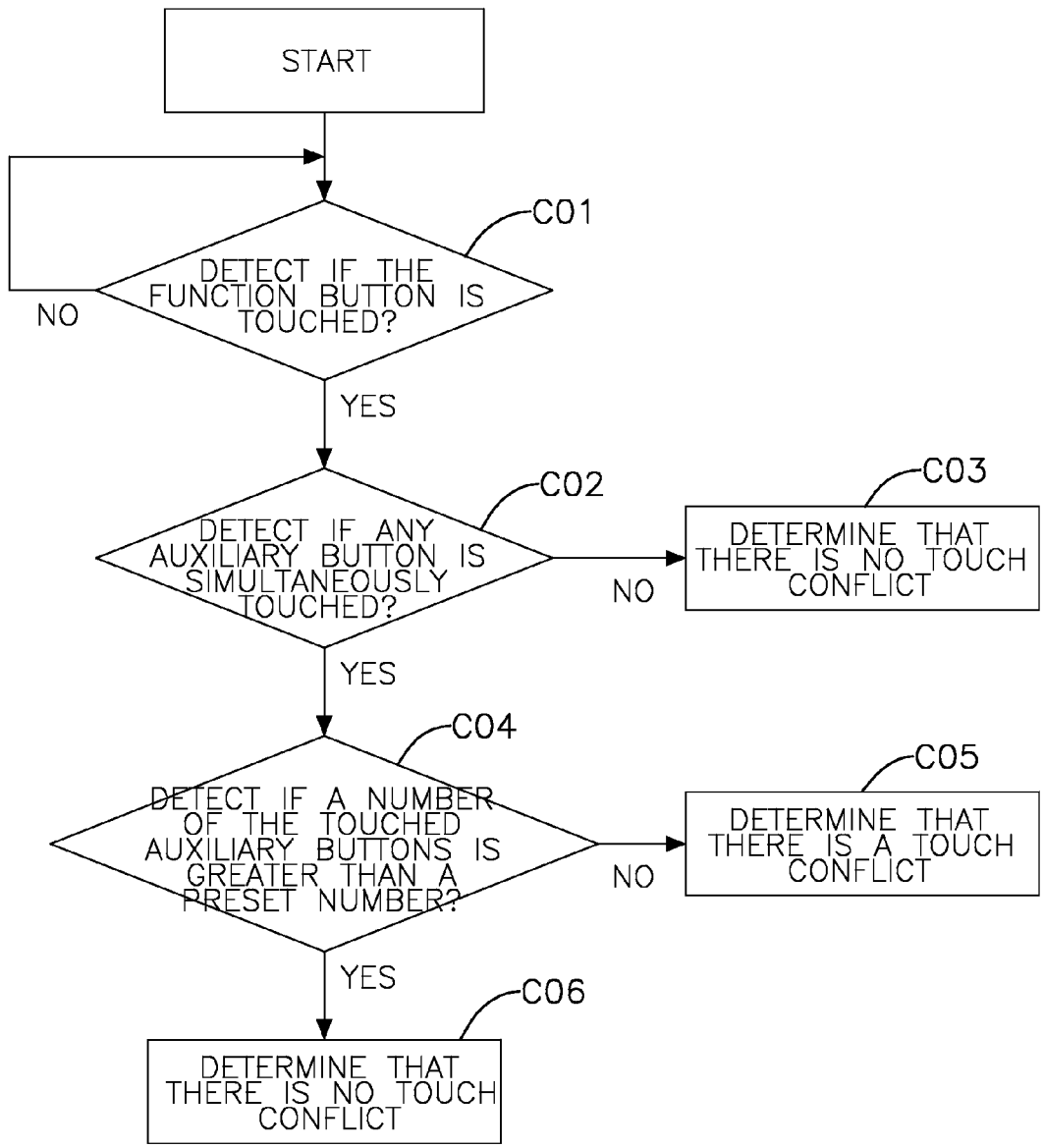
FIG. 9 is a flow diagram of a second embodiment of a method of identifying touch conflict on a touch device in accordance with the present invention.

The controller 20 is connected to the function button 11 and the auxiliary buttons 12~14 to detect a sensing signal variation generated after the function button 11 and the auxiliary buttons 12~14 are touched, and determines if there is a touch conflict according to the sensing signal variations of the function button 11 and the auxiliary buttons 12~14. With reference to FIG. 9, a second embodiment of a method of identifying touch conflict of a touch device in accordance with the present invention has the following steps.

Step C01: Detect if the function button is touched. If positive, perform next step; otherwise, resume the current step.

Step C02: Detect if any auxiliary button is simultaneously touched.

Step C03: If negative, determine that there is no touch conflict; otherwise, perform next step.

Step C04: Detect if a number of the touched auxiliary buttons is greater than a preset number.

Step C05: If positive, determine that there is a touch conflict; otherwise, determine that there is no touch conflict.

In the foregoing method of identifying touch conflict, when simultaneously detecting that the function button 11 is touched and that the number of the touched auxiliary buttons is greater than the preset number, the controller 20 determines that there is a touch conflict.

When the function button 11 and the auxiliary buttons 12~14 are arranged as those in the foregoing touch device, that is, three auxiliary buttons 12~14 respectively mounted on the positions of the virtual button area above and on the left and right of the function button 11 and suppose that the preset number of the touched auxiliary is two, the controller 20 determines that there is a touch conflict when detecting that the function button and at least two of the auxiliary buttons are touched. With reference to FIGS. 10A to 10D, the controller 20 determines that no touch conflict occurs under conditions as follows.

Figure 10:
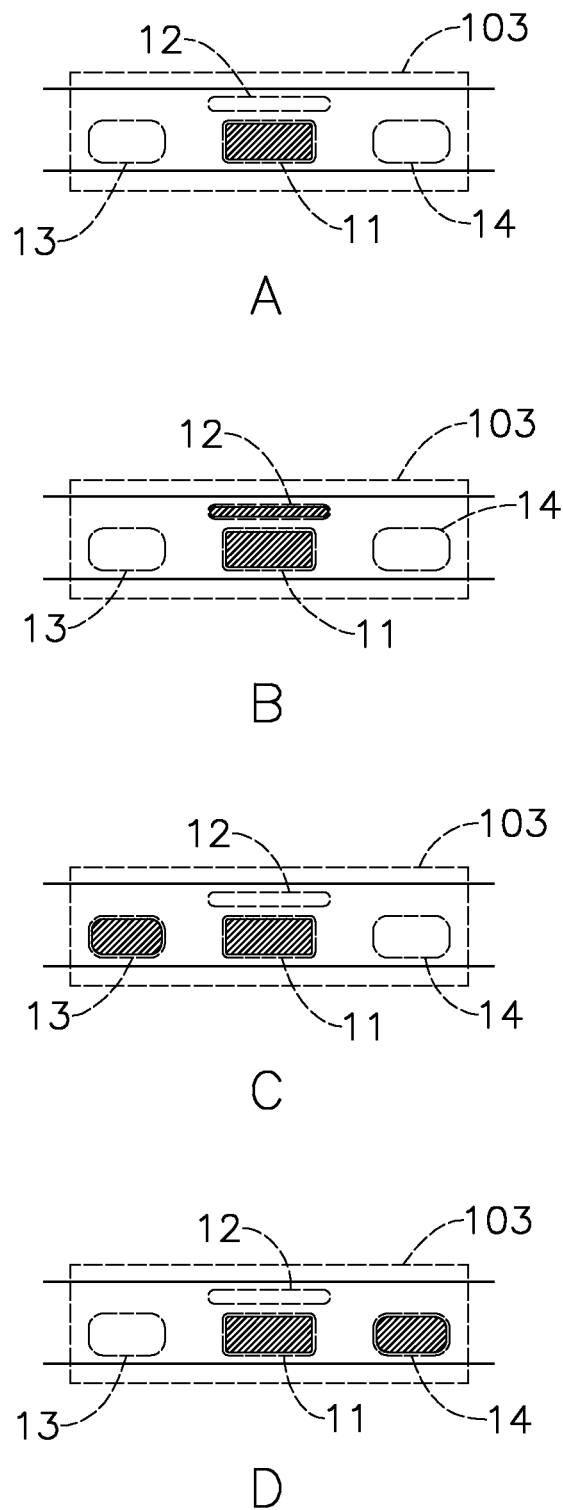
FIGS. 10A to 10D are schematic views illustrating four touched states determined by the method in FIG. 9.

The condition illustrated in FIG. 10A shows that a sensing signal variation is generated when only the function button 11 is touched and the auxiliary buttons 12~14 around the function button 11 are not touched and thus generate no sensing signal variation. Under the condition, as users' touch action is accurate and decisive, the controller 20 determines that no touch conflict occurs.

The conditions respectively illustrated in FIGS. 10B-10D show that only the function button 11 and one of the auxiliary button 12~14 (highlighted by slanted lines) generate sensing signal variations. As only one touched auxiliary button 12~14 is detected and the number of the touched auxiliary button 12~14 is less than the preset number, the controller 20 determines that there is no touch conflict occurring in the conditions as shown in FIGS. 10B~10D.

The conditions illustrated in FIGS. 11A and 11B show that one function button 11 and two auxiliary buttons 12~14 generate sensing signal variations. With reference to FIG. 11A, besides the function button 11, the auxiliary buttons 13, 14 on the left and right of the function button 11 also generate sensing signal variations. With reference to FIG. 11B, besides the function button 11, the auxiliary buttons 12, 14 above and on the right of the function button 11 also generate sensing signal variations. The controller 20 determines that there is touch conflict occurring in the conditions as shown in FIGS. 10B~10D.

To physically implement the method of identifying touch conflict, the controller 20 can normally send a command for executing a first function for each of the conditions without occurrence of touch conflict as shown in FIGS. 10A~10D.

As for the conditions illustrated in FIGS. 11A and 11B showing that there is touch conflict, the controller 20 can stop sending a command for executing a first function or further send a command for executing a second function beside stopping sending the command for executing the first function. The second function may serve to unlock a touch panel after a finger sequentially slides through the auxiliary buttons 13, 14 and the function button 11 along a direction of the length of the touch panel for the auxiliary buttons 13, 14 and the function 11 to sequentially generate sensing signal variations within a preset time.

Figure 12:
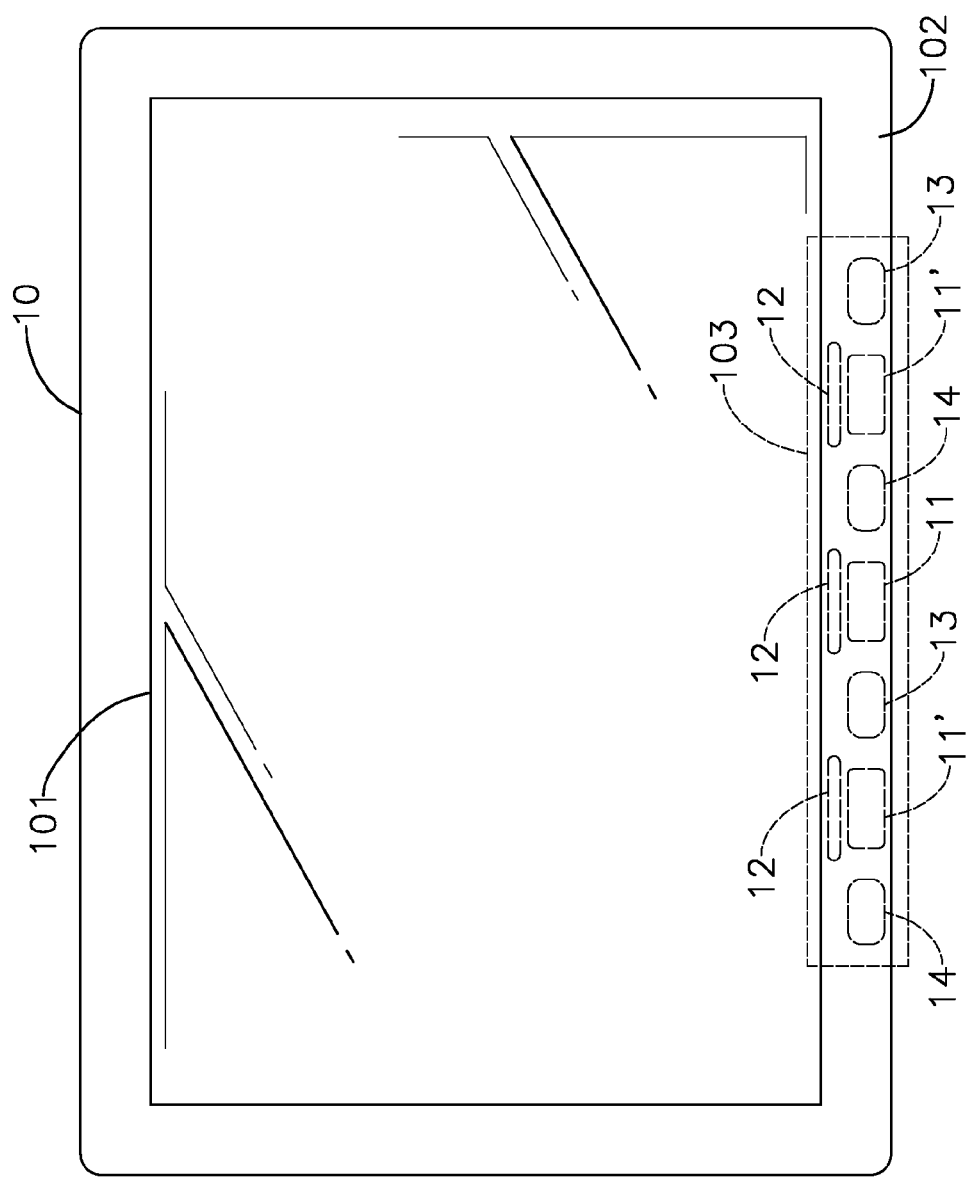
FIG. 12 is a schematic view of a third embodiment of a touch device in accordance with the present invention.

As mentioned in the foregoing description, the touch panel 10 may have at least one virtual button area 103, and each virtual button area 103 has a function button 11 and at least one auxiliary button. To those having ordinary skills of the related field of the present invention, it is comprehensible that there may be more than one function button 11 in the virtual button area 103. When there are multiple function buttons 11, 11' as shown in FIG. 12, the function buttons 11, 11' can be aligned next to each other along the direction of the length. One auxiliary button 13, 14 is mounted between each adjacent two of the function buttons 11, 11', and next to a leading or trailing function button 11'. Multiple auxiliary buttons 12 are mounted between a borderline between the view area 101 and the respective function buttons along the direction of the length.

Similar to the foregoing embodiment, with reference to FIG. 13A, a grounding protection line 15 is mounted around each function button 11, 11', or with reference to FIG. 13B, a grounding protection line 16 is mounted between each function button 11, 11' and a corresponding adjacent one of the auxiliary buttons 12, 14 to further ensure the correctness of the touch operation of the function buttons 11, 11'.

The touch panel 10 having the function button is formed by a substrate having a touch sensing area and a virtual button area defined thereon. The touch sensing area has a sensing layer fabricated therein to serve as a main operation interface of the touch panel 10. The virtual button area has multiple button electrodes fabricated therein to serve as the function button and the auxiliary button.

Figure 14:
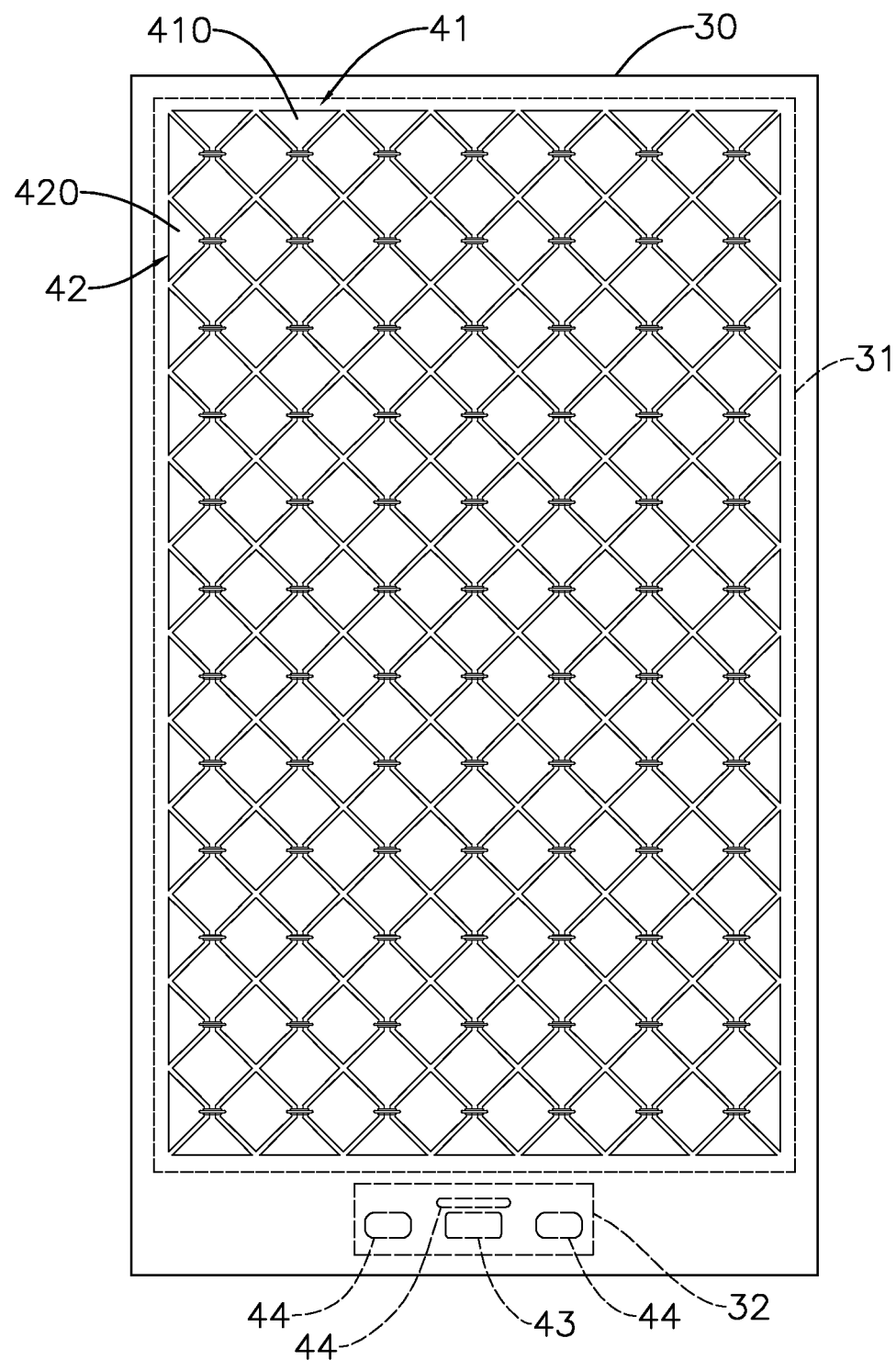
FIG. 14 is a schematic view of a substrate of a touch device manufactured by a first embodiment of a method of manufacturing a touch panel having virtual function button in accordance with the present invention.

With reference to FIG. 14, a substrate 30 of a touch device manufactured by a first embodiment of a method of manufacturing a touch panel having virtual button in accordance with the present invention has a relatively larger touch sensing area 31 and a relatively smaller virtual button area 32. The touch sensing area 31 has a sensing layer. In the present embodiment, the substrate 30 has a projected capacitive sensing layer fabricated within the touch sensing area 31 by using a semiconductor fabrication process and has the following steps.

Figure 15:
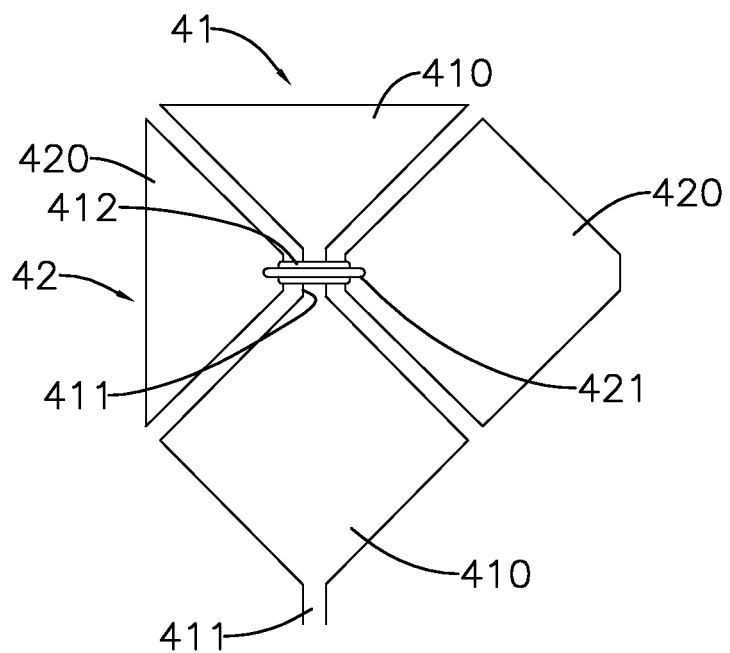
FIG. 15 is an enlarged schematic view of the substrate of the touch device in FIG. 14.

Step A: Form an X-axis sensing electrode layer on the substrate 30. The X-axis sensing electrode layer has multiple X-axis electrode arrays 41. With reference to FIG. 15, each X-axis sensing electrode array 41 is formed by multiple X-axis electrodes 410 with a connection part 411 connected between each adjacent two of the X-axis electrodes 410.

Step B: Form a Y-axis sensing electrode layer on the substrate 30. The Y-axis sensing electrode layer has multiple Y-axis electrodes 420. The Y-axis electrodes 420 and the X-axis electrodes 410 of the X-axis electrode layer are alternately arranged on the substrate 30.

Figure 16:
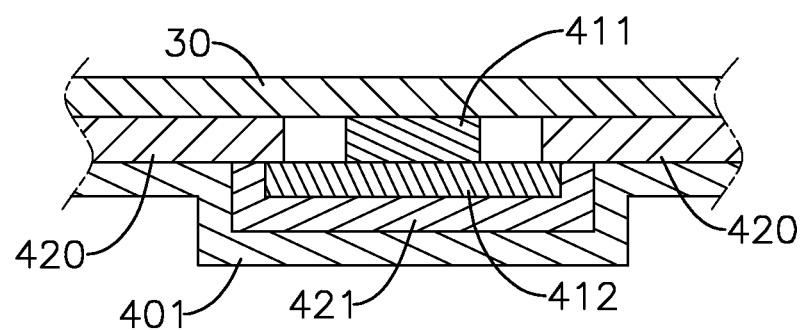
FIG. 16 is an enlarged cross-sectional schematic view of the substrate of the touch device in FIG. 14.

Step C: Form multiple insulation layers 412, each of which is formed between adjacent two of the X-axis electrodes 410 of the X-axis sensing electrode layer and across a corresponding connection part 411 as shown in FIG. 16.

Step D: Form multiple conductive bridging parts 421, each of which is formed on a corresponding insulation layer 412 with two ends of the bridging part 421 respectively connected with adjacent two of the Y-axis electrodes 420 so as to constitute multiple Y-axis electrode arrays 42.

Step E: Fabricate multiple X-axis signal lines and multiple Y-axis signal lines on the substrate 30 with silver paste. The X-axis signal lines and the Y-axis signal lines are respectively connected to the X-axis electrode arrays 41 and the Y-axis electrode arrays 42.

Step F: Form a protection layer 401 on the substrate to cover the X-axis sensing electrode layer and the Y-axis sensing electrode layer for the purpose of protection.

A projected capacitive sensing layer can be fabricated within the touch sensing area 31 of the substrate 30 through the foregoing fabrication process. A coupling capacitor is formed between each X-axis electrode 410 and a corresponding Y-axis electrode 420 adjacent thereto. When a finger or a conductive object approaches the X-axis electrodes 410 and the Y-axis electrodes 420, a newly sensed capacitance value can be obtained as a basis of determining if the touch panel is touched.

The virtual button area 32 of the substrate 30 has at least one function button electrode 43 and at least one auxiliary button electrode 44. The at least one function button electrode 43 and the at least one auxiliary button electrode 44 can be simultaneously completed in the foregoing semiconductor fabrication process for fabricating the projected capacitive sensing layer, and can be implemented by one of the steps of the following semiconductor fabrication process.

Step 1: When fabricating the X-axis electrode arrays of the X-axis sensing electrode layer within the touch sensing area 31, fabricate the at least one function button electrode 43 and the at least one auxiliary button electrode 44 within the virtual button area 32 in the same fabrication step. In other words, when the fabrication of the X-axis electrode arrays 41 within the touch sensing area 31 is completed, the fabrications of the at least one function button electrode 43 and the auxiliary button electrode 44 within the virtual button area 32 are also completed.

Step 2: When fabricating the Y-axis electrodes 420 of the Y-axis sensing electrode layer within the touch sensing area 31, fabricate the at least one function button electrode 43 and the at least one auxiliary button electrode 44 within the virtual button area 32 in the same fabrication step. In other words, when the fabrication of the Y-axis electrodes 420 within the touch sensing area 31 is completed, the fabrications of the at least one function button electrode 43 and the auxiliary button electrode 44 within the virtual button area 32 are also completed.

Step 3: When fabricating the bridging parts 421 of the Y-axis sensing electrode layer within the touch sensing area 31, fabricate the at least one function button electrode 43 and the at least one auxiliary button electrode 44 within the virtual button area 32 in the same fabrication step. In other words, when the fabrication of the bridging parts 421 within the touch sensing area 31 is completed, the fabrications of the at least one function button electrode 43 and the auxiliary button electrode 44 within the virtual button area 32 are also completed.

Step 4: When fabricating the X-axis signal lines and the Y-axis signal lines on the substrate 30 with silver paste, fabricate the at least one function button electrode 43 and the at least one auxiliary button electrode 44 within the virtual button area 32 with silver paste in the same fabrication step.

The substrate 30 may be one of a glass substrate or a Mylar substrate. The X-axis electrode arrays 41 of the X-axis sensing electrode layer, the Y-axis electrodes 420 of the Y-axis sensing electrode layer, the bridging parts 421, the function button electrodes 43, and the auxiliary button electrodes 44 are made of a transparent conductive material, such as Indium Tin Oxide (ITO, transparent electrode).

Instead of the semiconductor fabrication process, the sensing layers within the touch sensing area 31 and/or the function button electrodes 43 and the auxiliary button electrodes 44 of the virtual button area 32 may be manufactured by externally coating a conductive layer.

Figure 17:
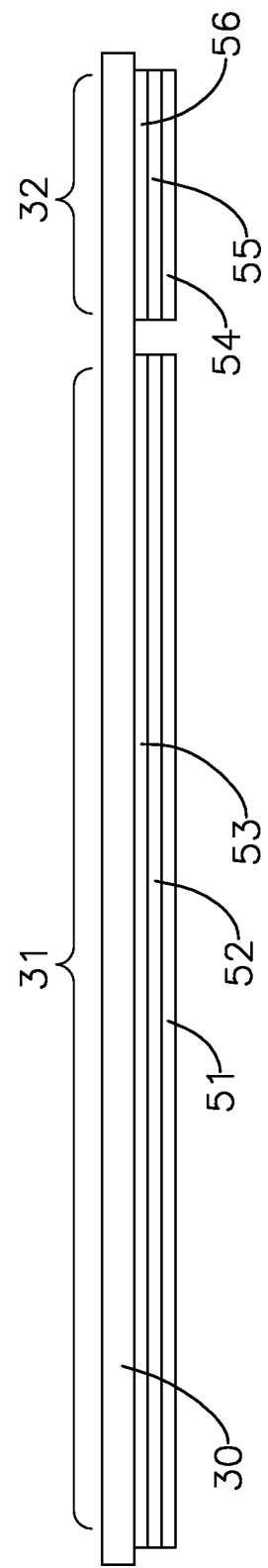
FIG. 17 is a cross-sectional schematic view of a substrate of a touch device manufactured by a second embodiment of a method of manufacturing a touch panel having virtual function button in accordance with the present invention.

With reference to FIG. 17, a substrate of a touch device manufactured by a second embodiment of a method of manufacturing a touch panel having virtual function button in accordance with the present invention also has a touch sensing area 31 and a virtual button area 32. The method of forming the sensing layers on the touch sensing area 31 has steps of forming a transparent electrode sensing layer 52 on a transparent and film-like carrier 51, and using a transparent adhesive layer 53 to affix the carrier 51 and the transparent electrode sensing layer 52 on top of the carrier 51 on the touch sensing area 31 of the substrate 30. The carrier 51 may be a PET transparent film. The transparent electrode sensing layer 52 may be formed by ITO. The transparent adhesive layer 52 is formed by optical clear adhesive (OCA).

The method of forming the function button electrode and the auxiliary button electrode within the virtual button area 32 is similar to the above-mentioned method and has steps of forming an electrode layer 55 constituting the function button electrode and the auxiliary button electrode on a transparent and film-like carrier 54, and using an adhesive layer 56 to affix the carrier 51 and the electrode layer 55 on top of the carrier 51 on the virtual button area 32 of the substrate 30.

When the function button electrode and the auxiliary button electrode within the virtual button area 32 are transparently formed on the substrate 30, the carrier 54 may be a PET transparent film, the electrode layer 55 is formed by ITO, and the adhesive layer 56 is formed by OCA. When the function button electrode and the auxiliary button electrode within the virtual button area 32 are opaquely formed on the substrate 30, the carrier 54 may be opaque or may not be a thin film. Specifically, the carrier 54 may be a printed circuit board (PCB), a flexible PCB (FPCB) or the like.

When the carrier 54 is a PCB, an FPCB or the like, the electrode layer 55 is formed by a copper clad laminate. The adhesive layer affixed on the substrate may be regular translucent adhesive.

In sum, the touch device of the present invention has at least one function button and at least one auxiliary button mounted around the at least one function button to detect a touch event of users on the at least one function button in collaboration with the method of identifying touch conflict built in the controller. When users simultaneously touch the at least one function button and the at least one auxiliary button, the controller determines that a touch conflict occurs. Besides, according to the detected touch conflict, the controller determines if the function originally defined by the function button or other function is executed. Such technique facilitates the analysis and determination of the intention of users upon touching the function button and provides different control functions to adapt to different application environments. For example, when a touch conflict occurs, the function originally defined by the function button is restricted, and such application is designed for prevention of touch conflicts. When a touch conflict occurs because the function button and the auxiliary button are touched within a preset time, such touch conflict can be construed that users touch the function button and the auxiliary button in a sliding manner. Under such special operation, in addition to restricting the function originally defined by the function button, other function can also be executed. Said other function includes, but is not limited to, touch panel unlocking, launching task list, and the like.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. An identifying method of a touch panel comprising a touch sensing area and a virtual button area, the identifying method comprising steps of:
   a. detecting a function button on the touch panel being touched, wherein the function button corresponds to a first function;
   b. detecting an auxiliary button on the touch panel being touched within a preset time after the function button is touched; and
   c. executing a second function after step b;
   wherein the function button and the auxiliary button are respectively located at two different fixed positions of the virtual button area and coupled to a controller.

2. The method as claimed in claim 1, wherein step c further comprises: stopping executing the first function.

3. The method as claimed in claim 1, wherein the second function is to lock or unlock the touch device.

4. The method as claimed in claim 1, wherein the second function is to launch a task list under a Windows operating system.

5. A touch device, comprising:
   a touch panel having:
   a virtual button area;
   at least one function button located within the virtual button area, wherein each function button corresponds to a first function; and
   at least one auxiliary button located around the at least one function button, wherein the at least one function button and the at least one auxiliary button are activated by touch and respectively located at different fixed positions of the virtual button area; and
   a controller connected to the at least one function button and the at least one auxiliary button,
   wherein the controller executes a second function if one of the at least one function button and one of the at least one auxiliary button are touched in sequence.

6. The touch device as claimed in claim 5, wherein the virtual button area of the touch panel has a length and a width, and the at least one function button and the at least one auxiliary button are aligned next to each other in a direction along the length.

7. The touch device as claimed in claim 5, wherein the virtual button area of the touch panel has a length and a width, the touch panel has multiple auxiliary buttons mounted within the virtual button area, and the at least one function button and the auxiliary buttons are aligned next to each other in a direction along the width.

8. The touch device as claimed in claim 5, wherein the virtual button area of the touch panel has a length and a width, the touch panel has multiple function buttons and multiple auxiliary buttons mounted within the virtual button area, and the function buttons and the auxiliary buttons are aligned next to each other in a direction along the width, and each auxiliary button is located between adjacent two of the function buttons.

9. The touch device as claimed in claim 5, wherein the virtual button area of the touch panel has a length and a width, and the at least one function button and the at least one auxiliary button are aligned next to each other along a direction of the width.

10. The touch device as claimed in claim 9, wherein the touch panel has a view area and an active zone formed around the view area, and the virtual button area is located within the view area.

11. The touch device as claimed in claim 9, wherein the touch panel has a view area and an active zone formed around the view area, and the virtual button area is located within the active zone.

12. The touch device as claimed in claim 11, wherein each one of the at least one auxiliary button is located between the view area and a corresponding function button.

13. The touch device as claimed in claim 11, wherein a grounding protection line is mounted between each one of the at least one function button and a corresponding auxiliary button.

14. The touch device as claimed in claim 5, wherein the controller executes the second function when one of the following conditions is satisfied: (1) the one of the at least one auxiliary button is touched within a preset time after the one of the at least one function button is touched, and (2) the one of the at least one function button is touched within the preset time after the one of the at least one auxiliary button is touched.

15. The touch device as claimed in claim 5, wherein the controller further stops executing the first function.

16. The touch device as claimed in claim 5, wherein the second function is to lock or unlock the touch device.

17. The touch device as claimed in claim 5, wherein the second function is to launch a task list under a Windows operating system.

18. An identifying method of a touch panel comprising a touch sensing area and a virtual button area, the identifying method comprising steps of:
   a. detecting an auxiliary button on the touch panel being touched;
   b. detecting a function button on the touch panel being touched within a preset time after the auxiliary button is touched, wherein the function button corresponds to a first function; and
   c. executing a second function after step b;
   wherein the function button and the auxiliary button are respectively located at two different fixed positions of the virtual button area and coupled to a controller.

19. The method as claimed in claim 18, wherein step c further comprises:
   stopping executing the first function.

20. The method as claimed in claim 18, wherein the second function is to lock or unlock the touch device.

21. The method as claimed in claim 18, wherein the second function is to launch a task list under a Windows operating system.

\* \* \* \* \*